R. S. BURDETTE.
FILM MASK FOR CAMERAS.
APPLICATION FILED NOV. 6, 1917.
1,280,958. Patented Oct. 8, 1918.
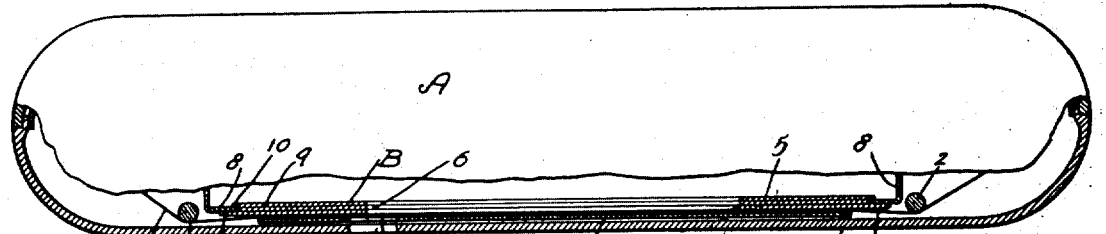
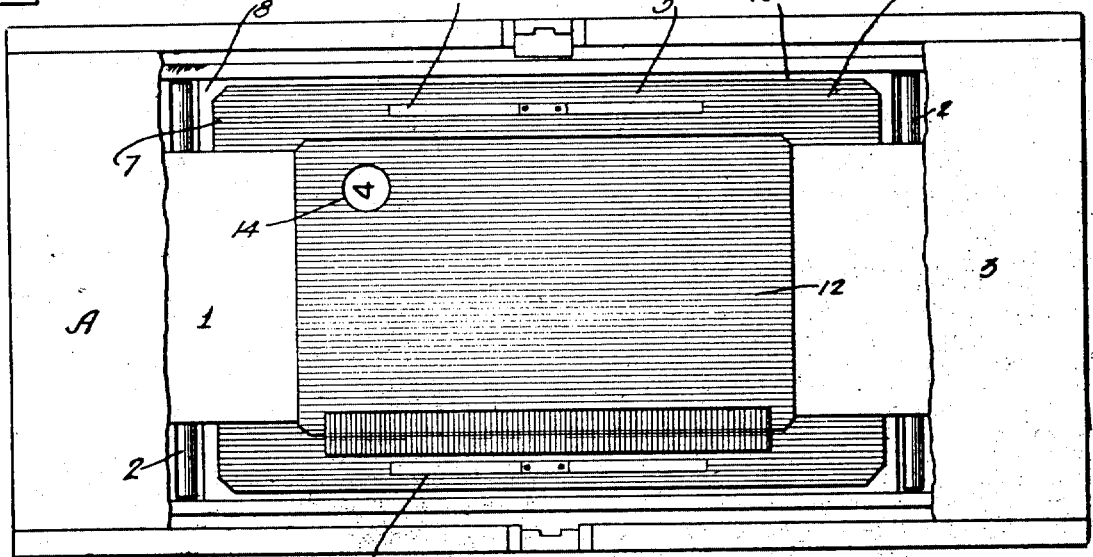
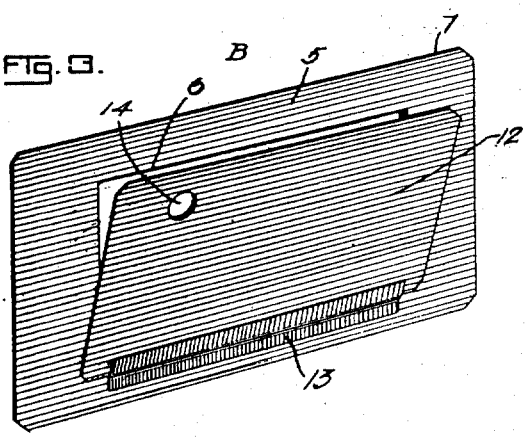 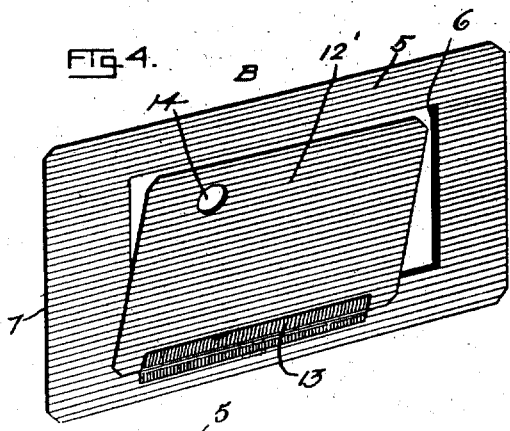
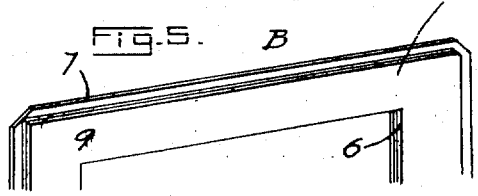
WITNESSES
INVENTOR
Richard S. Burdette
BY
ATTORNEYS

UNITED STATES PATENT OFFICE.

RICHARD STUART BURDETTE, OF SAN ANTONIO, TEXAS.

FILM-MASK FOR CAMERAS.

1,280,958.  Specification of Letters Patent.  Patented Oct. 8, 1918.

Application filed November 6, 1917. Serial No. 200,545.

*To all whom it may concern:*

Be it known that I, RICHARD S. BURDETTE, a citizen of the United States, and a resident of San Antonio, in the county of Bexar and State of Texas, have invented a new and Improved Film-Mask for Cameras, of which the following is a full, clear, and exact description.

This invention relates to roll film cameras of that type containing attachments for adapting the camera for films of different sizes, such as the invention disclosed in the United States Letters Patent 1,250,792, December 18, 1917; and the invention has to deal more particularly with an improved mask held in coöperative relation with the film by the camera back so as to permit a film smaller than the one intended for the camera to be used, there being masks of different sizes for the different size films.

The invention has for its general objects to improve the construction of masks of this character so as to be reliable and efficient in use, comparatively simple and inexpensive to manufacture, and so designed as to be readily applied and effectively held in place.

A more specific object of the invention is the provision of a mask in the form of a plate having an exposure opening and provided with novel means for retaining it in proper position in the frame of the camera, and for certain forms of camera the mask contains a flap which lies between the camera back and the film and serves to maintain the latter in the proper focal plane.

With such objects in view, and others which will appear as the description proceeds, the invention comprises various novel features of construction and arrangement of parts which will be set forth with particularity in the following description and claims appended thereto.

In the accompanying drawing, which illustrates one embodiment of the invention and wherein similar characters of reference indicate corresponding parts in all the views, Figure 1 is a plan view of a camera with a portion broken away to show the mask in position;

Fig. 2 is a rear view with a portion of the camera back broken away;

Figs. 3 and 4 are perspective views of two different forms of masks; and

Fig. 5 is a fragmentary perspective view showing the opposite face of the mask which is also devoid of the film-holding flap.

Referring to the drawing, A designates the casing of an ordinary camera of any type or form, and in the casing is a convertible film-holding winding mechanism such as that disclosed in the Letters Patent hereinbefore referred to. The film 1 passes over the usual rollers 2 and along the camera back 3, which latter has a peep-opening 4. The mask B comprises a plate-like member 5 having an exposure opening 6, and around the edge of the plate-like member or body 5 of the mask B is a marginal flange 7, which engages behind the frame structure 8 of the camera, the portion 9 of the mask fitting within the exposure opening 10 of the camera. In this manner the mask is prevented from moving either up or down, or laterally, in its own plane, and it is held by the camera back 3 against the frame structure 8, and, if desired springs 11 may be arranged on the mask, as shown in Fig. 2, which serve as pressure devices that are under tension when the camera back is in position, so that the mask is effectively held in place.

On the mask B may be arranged a plate-like flap 12 attached to the body of the mask by a flexible strip 13 forming a hinge, and this flap lies behind or in contact with the rear face of the mask when the camera is closed, and it serves to hold the film 1 in its proper focal plane. The flap may extend the full length of the exposure opening 6, as shown in Fig. 3, or it may extend short of one end of the exposure opening like the flap 12' in Fig. 4, which arrangement is especially adapted for the autographic camera. In certain types of camera the mask may be devoid of a flap, as shown in Fig. 5. The flap 12 or 12' has a peep opening 14 which registers with the peep opening 4 of the camera back.

The flap may be varied in thickness or shape to keep smaller films in the proper focal plane. The flap is essentially a filler to be employed when the construction of the camera makes it necessary to keep the smaller film used in the proper focal plane.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination with a camera adapted to accommodate films of different sizes, of a removable mask fitted in the camera, said mask having an exposure opening to accommodate a film smaller than the maximum size film intended for the camera, and means coöperating with said mask to hold said smaller film in the proper focal plane.

2. The combination with a camera adapted to accommodate a film of a certain size, of a removable and interchangeable mask fitted in the back of the camera and having an exposure opening adapted to accommodate a film of a smaller size, and means coöperating with the camera frame structure to hold the mask in place.

3. The combination with a camera adapted to accommodate a film of a certain size, of a removable mask fitted in the camera in front of the film thereof and having an exposure opening, and a hinged flap on the mask and lying behind the film to hold the latter in its proper focal plane.

4. The combination with a camera having a frame structure providing an exposure opening of a given size, means for supporting a film behind the exposure opening, and a mask fitted in the said opening and having an exposure opening of smaller size than the first-mentioned opening.

5. The combination with a camera having a frame structure providing an exposure opening of a given size, means for supporting a film behind the exposure opening, a mask fitted in the said opening and having an exposure opening of smaller size than the first-mentioned opening, and yielding means between the mask and back of the camera.

6. The combination with a camera having a frame structure providing an exposure opening of a given size, means for supporting a film behind the exposure opening, a mask fitted in the said opening and having an exposure opening of smaller size than the first-mentioned opening, and an element on the mask for engaging behind the film to maintain the latter in the proper focal plane.

7. A camera including a casing, a frame structure therein having an exposure opening, and means for feeding a film behind the structure, with a mask comprising a plate-like body disposed in the said exposure opening and having a peripheral flange engaging the rear of the frame structure, said mask being held in place by the back of the camera casing.

8. A camera including a casing, a frame structure therein having an exposure opening, and means for feeding a film behind the structure, with a mask comprising a plate-like body disposed in the said exposure opening and having a peripheral flange engaging the rear of the frame structure, said mask being held in place by the back of the camera casing, and a flap on the back of the mask for engaging behind the film to maintain the latter in its proper focal plane.

RICHARD STUART BURDETTE.